US012728652B2

(12) United States Patent
Takeuchi

(10) Patent No.: US 12,728,652 B2
(45) Date of Patent: Sep. 8, 2026

(54) HEATING DEVICE AND LIQUID DISCHARGE APPARATUS

(71) Applicant: Shohgo Takeuchi, Tokyo (JP)

(72) Inventor: Shohgo Takeuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 18/637,962

(22) Filed: Apr. 17, 2024

(65) Prior Publication Data

US 2024/0351353 A1 Oct. 24, 2024

(30) Foreign Application Priority Data

Apr. 20, 2023 (JP) ................................ 2023-069421
Mar. 5, 2024 (JP) ................................ 2024-033073

(51) Int. Cl.
*B41J 11/00* (2006.01)

(52) U.S. Cl.
CPC ...... *B41J 11/00242* (2021.01); *B41J 11/0024* (2021.01)

(58) Field of Classification Search
CPC ............. B41J 11/00242; B41J 11/0024; B41J 11/00216; B41J 11/00244; B41J 11/007
See application file for complete search history.

(56) References Cited

U.S. PATENT DOCUMENTS

2011/0063353 A1 3/2011 Takeuchi et al.
2011/0227980 A1 9/2011 Saitoh et al.
2021/0053342 A1* 2/2021 Yoshinuma .......... B41J 11/0022
2021/0370692 A1 12/2021 Sawase et al.

FOREIGN PATENT DOCUMENTS

JP 2021-162712 A 10/2021
JP 2021-187678 A 12/2021

* cited by examiner

*Primary Examiner* — Justin Seo
(74) *Attorney, Agent, or Firm* — Harness, Dickey & Pierce, P.L.C.

(57) ABSTRACT

A heating device includes a belt, a heater, a first temperature sensor, a second temperature sensor, a circuitry, and a heat-source controller. The heater includes a heat source to heat the belt. The first temperature sensor is disposed at a position facing the heater via the belt and separated from the belt to detect a first temperature of the belt. The second temperature sensor is disposed at a position directly facing the heater and separated from the heater, to detect a second temperature of the heater. The circuitry corrects the first temperature detected by the first temperature sensor based on the second temperature detected by the second temperature sensor. The heat-source controller controls the heat source based on the first temperature corrected by the circuitry.

6 Claims, 6 Drawing Sheets

COMPARATIVE EXAMPLE

HEATING DEVICE AND LIQUID DISCHARGE APPARATUS

CROSS-REFERENCE TO RELATED APPLICATIONS

This patent application is based on and claims priority pursuant to 35 U.S.C. § 119 (a) to Japanese Patent Application No. 2023-069421, filed on Apr. 20, 2023, in the Japan Patent Office, and Japanese Patent Application No. 2024-033073, filed on Mar. 5, 2024, in the Japan Patent Office, the entire disclosure of which are hereby incorporated by reference herein.

BACKGROUND

Technical Field

Embodiments of the present disclosure relate to a heating device and liquid discharge apparatus.

Related Art

A heating device heats a belt such as a conveyor belt to convey an object.

For example, a heating device includes a conveyance belt heated by a heating element inside a driven roller that causes the conveyance belt to move in a circumferential direction. In such a heating device, the temperature of the conveyance belt is detected by a radiation thermometer, and the detected temperature of the conveyance belt is employed for controlling the heating element.

SUMMARY

In an embodiment of the present disclosure, a heating device includes a belt, a heater, a first temperature sensor, a second temperature sensor, a circuitry, and a heat-source controller. The heater includes a heat source to heat the belt. The first temperature sensor is disposed at a position facing the heater via the belt and separated from the belt to detect a first temperature of the belt. The second temperature sensor is disposed at a position directly facing the heater and separated from the heater, to detect a second temperature of the heater. The circuitry corrects the first temperature detected by the first temperature sensor based on the second temperature detected by the second temperature sensor. The heat-source controller controls the heat source based on the first temperature corrected by the circuitry.

In another embodiment of the present disclosure, a liquid discharge apparatus includes a liquid discharger to discharge liquid onto a conveyance object and the heating device to heat the conveyance object onto which the liquid is applied by the liquid discharger.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
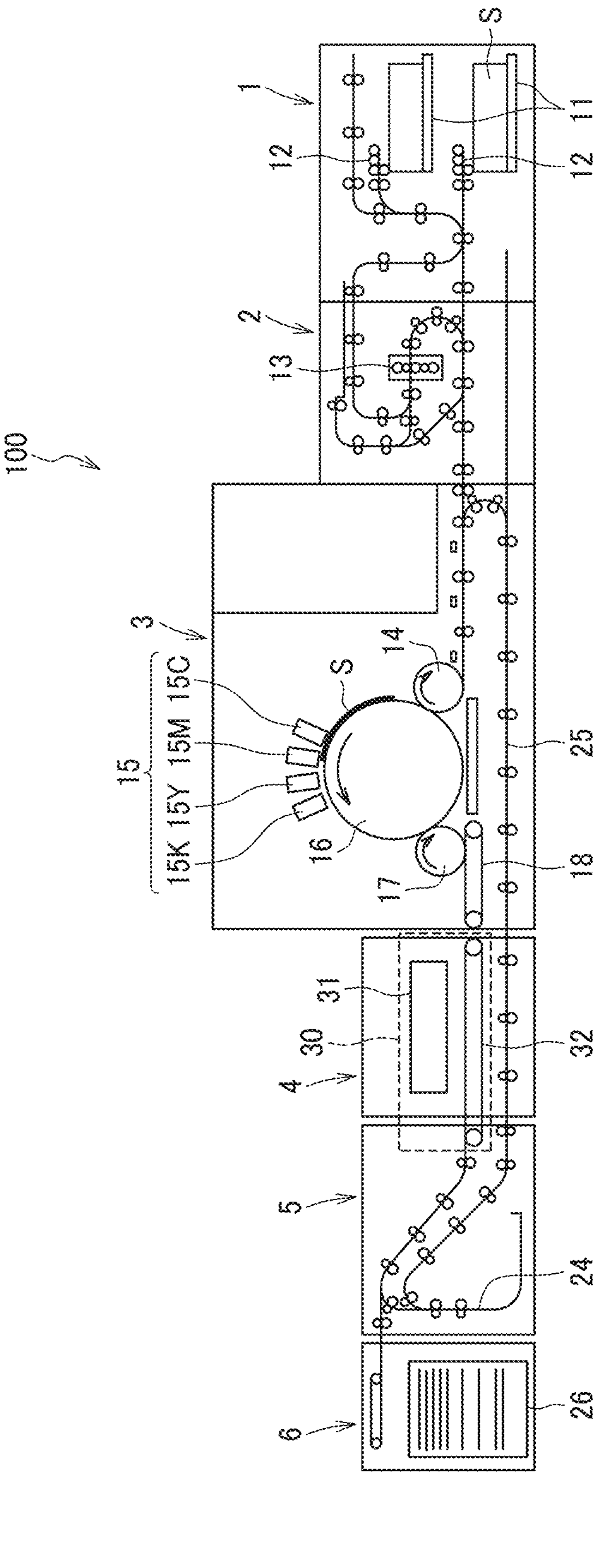
FIG. 1 is a diagram illustrating a configuration of a liquid discharge apparatus according to an embodiment of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the drawings for illustrating embodiments of the present disclosure, like reference numerals are assigned to elements such as components and parts that have a like function or a like shape as long as differentiation is possible, and descriptions of such elements may be omitted once the description is provided.

Configuration of Liquid Discharge Apparatus

First, a liquid discharge apparatus 100 according to an embodiment of the disclosure is described with reference to FIG. 1.

The liquid discharge apparatus 100 of FIG. 1 is an inkjet-type image forming apparatus that discharges liquid onto a sheet S to form an image. The liquid discharge apparatus 100 includes a sheet feeder 1, a pretreatment device 2, an image former 3, a drier 4, a reversing device 5, and a sheet output tray 6.

The sheet feeder 1 supplies sheets S as recording media each on which an image is formed. The sheet feeder 1 includes supply trays 11 capable of accommodating multiple sheets S, and a feeding device 12 that separates and feeds the sheets S one by one from the supply trays 11. The sheet S fed by the feeding device 12 is supplied to the pretreatment device 2.

The pretreatment device 2 applies a treatment liquid to the sheet S supplied from the sheet feeder 1. The pretreatment device 2 includes a treatment-liquid application device 13 that applies the treatment liquid to the sheet S. For example, the treatment liquid is liquid with a function to coagulate ink and is applied by the treatment-liquid application device 13 onto the sheet S on which an image is not yet formed to prevent bleeding or feathering of ink or to assist permeation. As a result, image quality can be improved. The sheet S that has been applied with the treatment liquid is conveyed to the image former 3.

The image former 3 forms an image on the sheet S. The image former 3 includes a liquid discharger 15, a first bearing rotator 14, a second bearing rotator 16, a third bearing rotator 17, and an upstream conveyance belt 18. The first bearing rotator 14, the second bearing rotator 16, and the third bearing rotator 17 are rotators that rotate while bearing the sheet S on the respective outer circumferential surfaces to convey the sheet S. The sheet S that is conveyed from the pretreatment device 2 is borne on the first bearing rotator 14 and is transferred onto the second bearing rotator 16. The sheet S that is transferred onto the second bearing rotator 16 is transferred from the second bearing rotator 16 to the third bearing rotator 17. Subsequently, the sheet S is transferred from the third bearing rotator 17 to the upstream conveyance belt 18. The liquid discharger 15 includes multiple liquid discharge units 15C, 15M, 15Y, and 15K that discharge liquid ink onto the sheet S borne on the second bearing rotator 16. In the present embodiment, the liquid discharge unit 15C that discharges cyan ink, the liquid discharge unit 15M that discharges magenta ink, the liquid discharge unit 15Y that discharges yellow ink, and the liquid discharge unit 15K that discharges black ink are arranged in the order listed from upstream to downstream in the rotation direction of the second bearing rotator 16, i.e., a sheet conveyance direction of the sheet S. The arrangement of the liquid discharge units 15C, 15M, 15Y, and 15K is not limited to the order illustrated in FIG. 1, and the liquid discharge units 15C, 15M, 15Y, and 15K may be arranged in any order. In addition, a liquid discharge unit that discharges ink of a special color such as white, gold, or silver may be added as needed. When the sheet S is conveyed to positions facing each of the liquid discharge units 15C, 15M, 15Y, and 15K, ink is discharged from each of the liquid discharge units 15C, 15M, 15Y, and 15K to the sheet S. Thus, an image is formed on the sheet S.

The drier 4 includes a heating device 30 including a heater 31 and a downstream conveyance belt 32. The heater 31 heats the sheet S to dry the ink on the sheet S. The heater 31 may be a non-contact type heater such as a hot-air generator or a high-frequency induction heater disposed in a non-contact manner with respect to the sheet S, or a contact heater such as a heating roller or a heating drum disposed in a contact manner with respect to the sheet S. The downstream conveyance belt 32 is disposed below the heater 31 to face the heater 31. When the sheet S is transferred from the upstream conveyance belt 18 to the downstream conveyance belt 32, the sheet S is conveyed by the downstream conveyance belt 32. When the sheet S is conveyed to a position facing the heater 31, the sheet S is heated by the heater 31, and drying of the ink on the sheet S is promoted.

The reversing device 5 includes a mechanism for reversing the sheet S and conveying the sheet S to the image former 3 again when duplex printing is performed. Specifically, the reversing device 5 includes a switchback conveyor 24 and a return conveyor 25. When images are formed on both sides of the sheet S, after an image is formed on the front side of the sheet S in the image former 3, the sheet S passes through the drier 4 and is conveyed to the reversing device 5. Subsequently, after the sheet S is conveyed in a reversed direction back to front by the switchback conveyor 24, the sheet S is conveyed to a position upstream from the first bearing rotator 14 via the return conveyor 25. Accordingly, the sheet S is conveyed to the image former 3 with the front and back sides of the sheet S reversed. Then, in the image former 3, an image is formed on the back side of the sheet S. Subsequently, the sheet S is subjected to drying processing by the drier 4 and is conveyed from the reversing device 5 to the sheet output tray 6.

The sheet output tray 6 serves as an output tray on which the sheet S on which an image has been formed is ejected. The sheet output tray 6 includes an output tray 26. When the sheet S is conveyed from the reversing device 5 to the sheet output tray 6, the sheet S is sequentially stacked on the output tray 26.

Configuration of Liquid Discharge Unit

Figure 2:
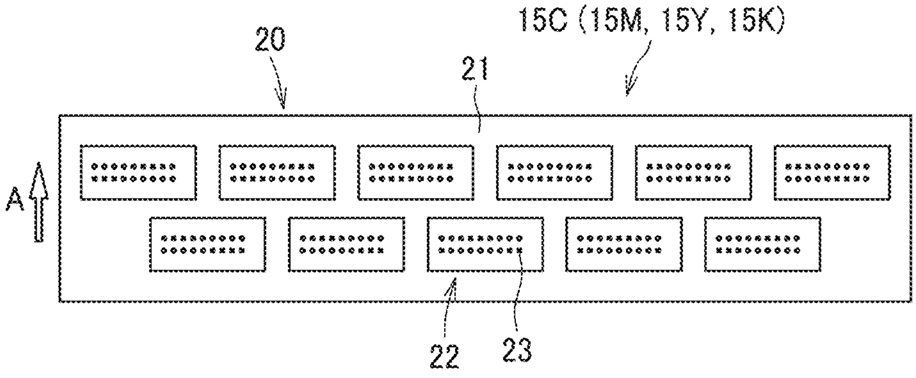
FIG. 2 is a diagram illustrating a configuration of a liquid discharge unit according to an embodiment of the present disclosure.

FIG. 2 is a diagram illustrating a configuration of the liquid discharge units 15C, 15M, 15Y, and 15K according to an embodiment of the present disclosure.

As illustrated in FIG. 2, each of the liquid discharge units 15C, 15M, 15Y, and 15K has a head module 20 including, for example, full-line type heads. The head module 20 includes a base 21 and multiple liquid discharge heads 22 alternately arranged on the base 21 in the longitudinal direction of the head module 20. Each of the multiple liquid discharge heads 22 includes multiple nozzle rows each including multiple nozzles 23 arranged in a sheet width direction, i.e., a horizontal direction in FIG. 2, intersecting a sheet conveyance direction A in FIG. 2. When discharge driving of the liquid discharge units 15C, 15M, 15Y, and 15K is controlled by drive signals based on image data, ink is discharged from the nozzles 23 to the sheet S, and an image corresponding to the image data is formed on the sheet S.

Configuration of Heating Device According to Comparative Example

A description is now given below of a configuration of a heating device according to a comparative example different from embodiments of the present disclosure.

Figure 9:
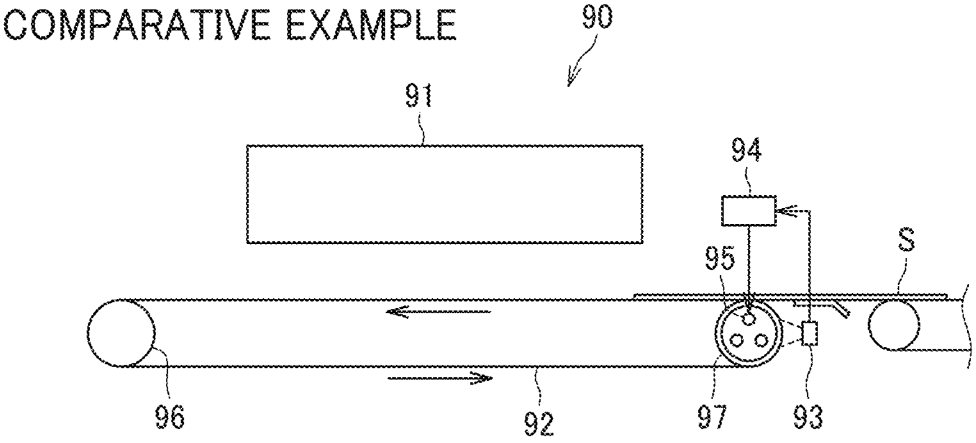
FIG. 9 is a diagram illustrating a heating device according to a comparative example.

FIG. 9 is a diagram illustrating a heating device 90 according to the comparative example. Specifically, the heating device 90 includes, for example, a heater 91, a conveyance belt 92, a temperature sensor 93, a heat-source controller 94. The heater 91 is a heater such as a hot-air generator that heats the sheet S on the conveyance belt 92. The conveyance belt 92 is wound around multiple rotatable rollers, i.e., a roller 96 and a heating roller 97. When the roller 96 and the heating roller 97 rotate, the conveyance belt 92 moves around, i.e., rotates, in accordance with the rotation of the roller 96 and the heating roller 97, and the sheet S on the conveyance belt 92 is conveyed.

Among the roller 96 and the heating roller 97, the heating roller 97 that is disposed upstream in the sheet conveyance direction is a heating roller including heat sources 95 inside the heating roller 97. When the heating roller 97 is heated by the heat emitted from the heat sources 95, the heat of the heating roller 97 is transmitted to the conveyance belt 92, and the conveyance belt 92 is heated. Heating the conveyance belt 92 allows the sheet S to be heated in advance before the sheet S reaches the heater 91. Such a configuration as described above can prevent the sheet S from shrinking due to rapid heating of the sheet S by the heater 91.

The output, i.e., the amount of heat generation, of the heat sources 95 is controlled by the heat-source controller 94. The heat-source controller 94 controls the heat sources 95 based on the temperature of the conveyance belt 92 detected by the temperature sensor 93. Accordingly, the temperature of the conveyance belt 92 is maintained so as not to excessively increase.

As described above, in the configuration in which the heat sources 95 are controlled based on the temperature of the conveyance belt 92 detected by the temperature sensor 93, preferably, the temperature of the conveyance belt 92 is accurately detected to appropriately control the heat sources 95. However, in the heating device 90 according to the comparative example, the temperature of the conveyance belt 92 cannot be detected with high accuracy. More specifically, the temperature sensor 93 is disposed to face the heating roller 97 via the conveyance belt 92. For this reason, infrared radiation that is input to the temperature sensor 93 includes not only the infrared radiation of the conveyance belt 92 but also the infrared radiation of the heating roller 97. In other words, the temperature detected by the temperature sensor 93 is affected by the infrared radiation from the heating roller 97. For this reason, the temperature of the conveyance belt 92 cannot be obtained with high accuracy. In addition, the degree to which the temperature of the conveyance belt 92 detected by the temperature sensor 93 is affected by the infrared radiation of the heating roller 97 varies depending on the materials of the conveyance belt 92 and the heating roller 97. For this reason, in the heating device 90 of the comparative example, the heat source 95 cannot be appropriately controlled based on the detected temperature of the conveyance belt 92.

Therefore, in the liquid discharge apparatus 100 according to an embodiment of the present disclosure, a configuration to be described below is adopted to accurately obtain the temperature of the conveyance belt 92. A description is now given below of a configuration of the heating device 30 according to an embodiment of the present disclosure.

Configuration of Heating Device

Figure 3:
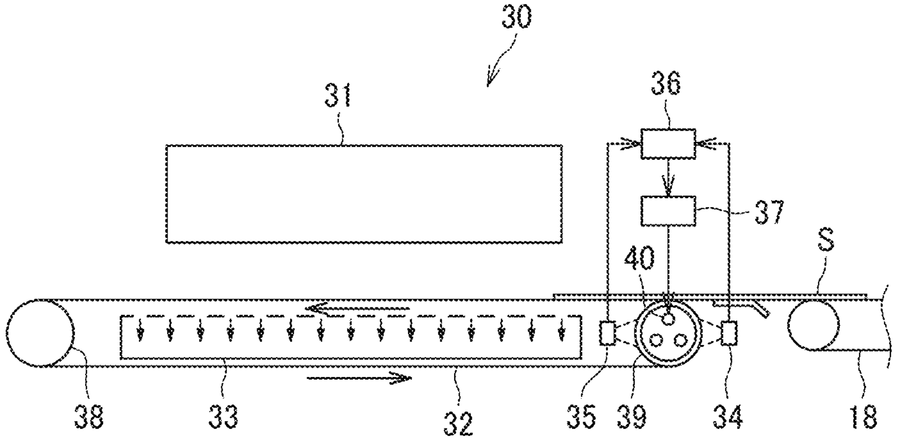
FIG. 3 is a diagram illustrating a configuration of a heating device according to an embodiment of the present disclosure.

FIG. 3 is a diagram illustrating a configuration of the heating device 30 according to an embodiment of the present disclosure.

As illustrated in FIG. 3, the heating device 30 includes a suction unit 33, a first temperature sensor 34, a second temperature sensor 35, a temperature corrector 36, and a heat-source controller 37, in addition to the heater 31 and the downstream conveyance belt 32.

The suction unit 33 is, for example, a suction chamber disposed inside the loop of the endless downstream conveyance belt 32. When the suction unit 33 is driven, air is sucked from multiple suction holes disposed in the downstream conveyance belt 32. Thus, the sheet S is attracted to and borne on the upper surface of the downstream conveyance belt 32. As the material for the downstream conveyance belt 32, for example, a mesh-shaped belt may be employed.

The downstream conveyance belt 32 is wound around a support roller 38 and a heating roller 39 and is supported such that the downstream conveyance belt 32 circulates, i.e., rotates around the support roller 38 and the heating roller 39. When the support roller 38 and the heating roller 39 rotate, the downstream conveyance belt 32 moves in a circumferential direction in the direction indicated by the arrows in FIG. 3. Thus, the sheet S is conveyed.

The heating roller 39 includes a heat source 40 inside the heating roller 39 and serves as a heater to heat the downstream conveyance belt 32. As the heat source 40, a radiant-heat type heater that emits infrared rays, such as a halogen heater or a carbon heater, is employed. The number of the heat source 40 disposed inside the heating roller 39 may be one or greater than one. The heater may be disposed separately from the support roller 38 that supports the downstream conveyance belt 32. The heater may be a contact-type heater such as a heating roller that contacts the downstream conveyance belt 32 to heat the downstream conveyance belt 32 or may be a non-contact type heater that is disposed in a non-contact manner with respect to the downstream conveyance belt 32.

When the heat source 40 generates heat and the heating roller 39 is heated, the heat of the heating roller 39 is transmitted to the downstream conveyance belt 32 and the downstream conveyance belt 32 is heated. After the downstream conveyance belt 32 is heated by the heating roller 39 disposed at an upstream end of the downstream conveyance belt 32 in the sheet conveyance direction, the downstream conveyance belt 32 is further heated by the heater 31. However, after the downstream conveyance belt 32 is further heated, when the surface of the downstream conveyance belt 32 passes through the heater 31, the temperature of the downstream conveyance belt 32 is lowered. However, when the downstream conveyance belt 32 reaches the position of the heating roller 39 again, the sheet S is heated by the heating roller 39. Accordingly, the sheet S can be warmed at the upstream end of the downstream conveyance belt 32. Such a configuration as described above prevents the sheet S from shrinking due to rapid heating of the sheet S by the heater 31.

The first temperature sensor 34 is a non-contact type temperature sensor that is disposed in a non-contact manner with respect to the downstream conveyance belt 32 and detects the temperature of the downstream conveyance belt 32. The second temperature sensor 35 is a non-contact type temperature sensor that is disposed in a non-contact manner with respect to the heating roller 39 and detects the temperature of the heating roller 39. Examples of the first temperature sensor 34 and the second temperature sensor 35 include, for example, a radiation thermometer that receives infrared radiation emitted from an object to detect the temperature of the object.

Specifically, the first temperature sensor 34 is disposed to face the outer circumferential surface of a portion of the downstream conveyance belt 32 wound around the heating roller 39. In other words, the first temperature sensor 34 is disposed at a position facing the heating roller 39 via the downstream conveyance belt 32. By contrast, the second temperature sensor 35 is disposed to directly face the heating roller 39 inside the loop of the downstream conveyance belt 32. In other words, the second temperature sensor 35 is disposed at a position facing the heating roller 39 without the downstream conveyance belt 32 interposed between the second temperature sensor 35 and the heating roller 39. The term "face" employed above means that a detection element or a detection region for detecting the temperature of the first temperature sensor 34 and the second temperature sensor 35 faces the downstream conveyance belt 32 or the heating roller 39.

The temperature corrector 36 corrects the temperature detected by the first temperature sensor 34 based on the temperature detected by the second temperature sensor 35. In other words, the temperature corrector 36 corrects the temperature of the downstream conveyance belt 32 detected by the first temperature sensor 34 based on the temperature data of the heating roller 39 detected by the second temperature sensor 35.

The heat-source controller 37 controls the heat source 40 based on the temperature corrected by the temperature corrector 36.

Configuration of Controller

Figure 4:
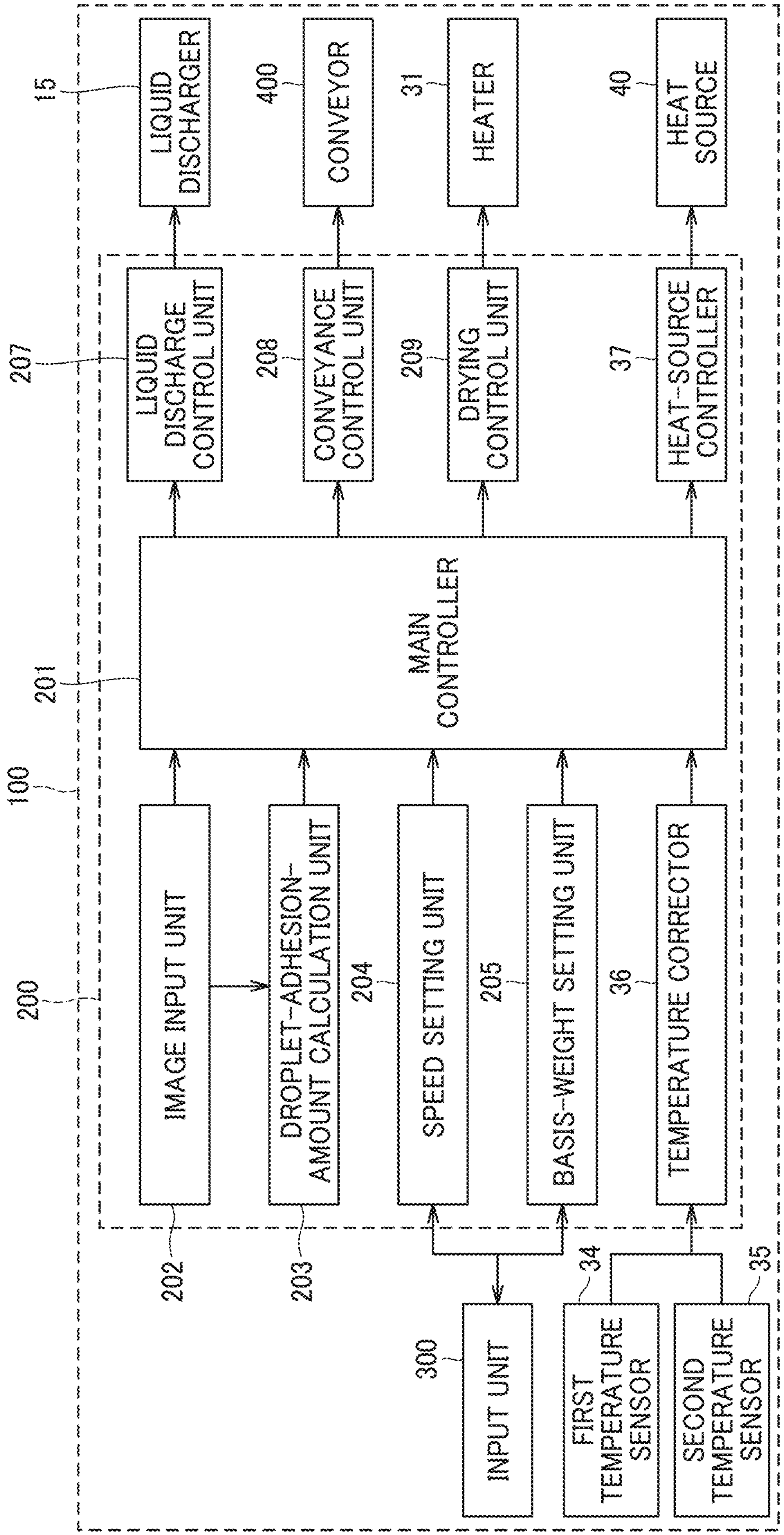
FIG. 4 is a block diagram of a controller according to an embodiment of the present disclosure.

A description is now given below of a configuration of a controller 200 according to an embodiment of the present disclosure with reference to FIG. 4.

The liquid discharge apparatus 100 according to the present embodiment includes the controller 200 that controls various functions of the liquid discharge apparatus 100. Specifically, the controller 200 includes a main controller 201, an image input unit 202, a droplet-adhesion-amount calculation unit 203, a speed setting unit 204, a basis-weight setting unit 205, a liquid discharge control unit 207, a conveyance control unit 208, and a drying control unit 209, in addition to the temperature corrector 36 and the heat-source controller 37.

The main controller 201 controls the entire liquid discharge apparatus 100. The main controller 201 controls the liquid discharge control unit 207, the conveyance control unit 208, the drying control unit 209, and the heat-source controller 37 based on various data sent from the image input unit 202, the droplet-adhesion-amount calculation unit 203, the speed setting unit 204, the basis-weight setting unit 205, and the temperature corrector 36.

The image input unit 202 is a unit to which image data of an image to be printed is input from the outside. The image data that is input to the image input unit 202 is sent to the main controller 201 and the droplet-adhesion-amount calculation unit 203.

The droplet-adhesion-amount calculation unit 203 calculates the droplet adhesion amount of liquid necessary for image formation based on the image data sent from the image input unit 202. The droplet adhesion amount calculated by the droplet-adhesion-amount calculation unit 203 is sent to the main controller 201.

The speed setting unit 204 sets a sheet conveyance speed. The sheet conveyance speed data that is set by the speed setting unit 204 is sent to the main controller 201.

The basis-weight setting unit 205 sets the basis weight of the sheet for each type of the sheet. The basis weight that is set by the basis-weight setting unit 205 is sent to the main controller 201.

The liquid discharge control unit 207 controls driving of the liquid discharger 15. The liquid discharge control unit 207 controls the discharge operation of the liquid discharge units 15C, 15M, 15Y, and 15K included in the liquid discharger 15.

The conveyance control unit 208 controls driving of the conveyor 400 including conveyance rollers that convey a sheet S. The conveyance control unit 208 controls the conveyance speed, i.e., rotation speed, of the conveyance roller.

The drying control unit 209 controls driving of the heater 31. The drying control unit 209 controls, for example, air volume and the temperature of warm air blown onto a sheet S, or the temperature of the heating roller that heats the sheet S.

The liquid discharge apparatus 100 according to the present embodiment includes an input unit 300. The input unit 300 is, for example, a touch-panel type input unit. Data such as the type of sheet and the sheet conveyance speed is input to the input unit 300 by an operator or a user. The data that is input to the input unit 300 is sent to the speed setting unit 204 and the basis-weight setting unit 205.

The main controller 201 controls the conveyance control unit 208 based on the data of the sheet conveyance speed sent from the speed setting unit 204. Accordingly, the conveyance control unit 208 controls the driving of the conveyor 400, and the sheet S is conveyed at the set speed.

The main controller 201 controls the liquid discharge control unit 207 based on the image data sent from the image input unit 202. Accordingly, the liquid discharge control unit 207 controls the liquid discharger 15 to cause the liquid discharger 15 to discharge liquid. Thus, an image is formed on the sheet S.

The main controller 201 controls the drying control unit 209 based on the droplet adhesion amount sent from the droplet-adhesion-amount calculation unit 203 and the basis weight of the sheet S sent from the basis-weight setting unit 205. When the droplet adhesion amount of the liquid discharged onto the sheet S is large or when the basis weight of the sheet S is large, a large amount of thermal energy is necessary to dry the sheet S. For this reason, the main controller 201 controls the drying control unit 209 based on the droplet adhesion amount, the basis weight, and the temperature data, and controls the driving of the heater 31. Accordingly, the sheet S is dried favorably.

The main controller 201 controls the heat-source controller 37 based on the temperature data sent from the temperature corrector 36. Accordingly, the heat-source controller 37 controls the heat source 40, and the downstream conveyance belt 32 is heated at a predetermined temperature.

Figure 5:
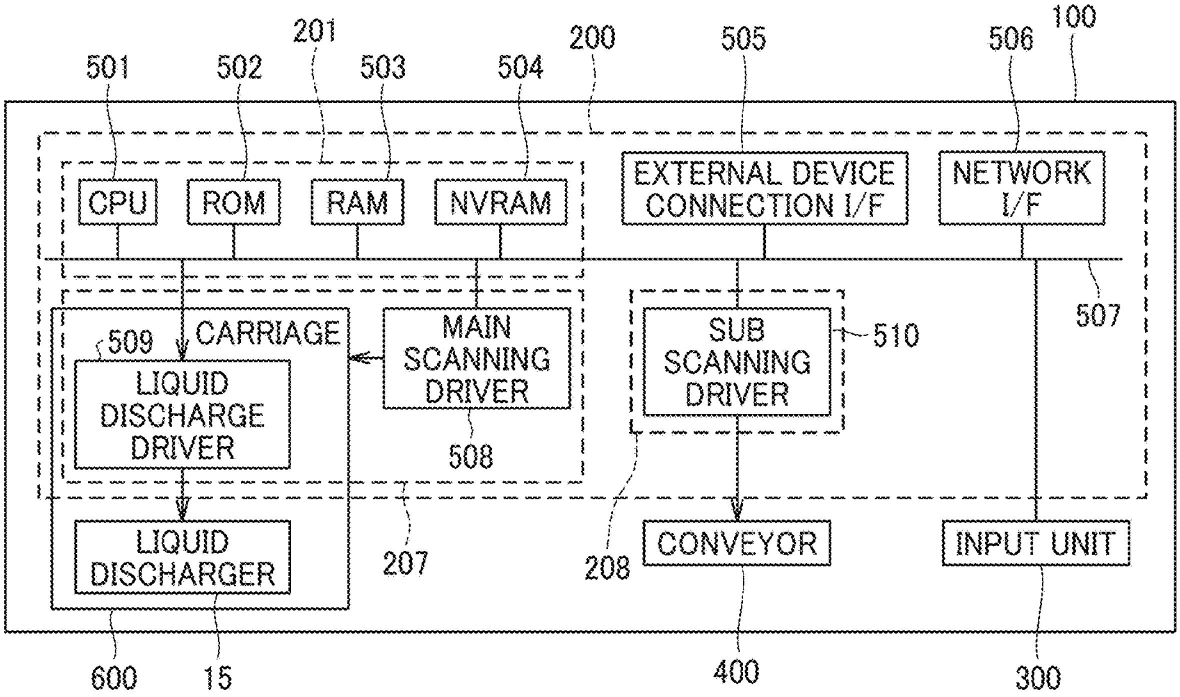
FIG. 5 is a block diagram of the controller of FIG. 4 in more detail.

FIG. 5 is a block diagram of the controller 200 in more detail, according to an embodiment of the present disclosure.

As illustrated in FIG. 5, the controller 200 includes the main controller 201, the liquid discharge control unit 207, the conveyance control unit 208, an external device connection interface (I/F) 505, a network I/F 506, and a bus line 507.

The main controller 201 includes a central processing unit (CPU) 501, a read only memory (ROM) 502, a random access memory (RAM) 503, and a non-volatile random access memory (NVRAM) 504. The CPU 501 controls the operation of the entire liquid discharge apparatus 100. The ROM 502 stores a program, such as an initial program loader (IPL), employed for driving the CPU 501. The RAM 503 is employed as a work area of the CPU 501. The NVRAM 504 stores various kinds of data such as a program and holds various kinds of data even while the power of the liquid discharge apparatus 100 is shut off.

The external device connection I/F 505 is connected to a personal computer (PC) via a universal serial bus (USB) cable and performs data transmission of control signals and images to be printed with the PC. The network interface 506 is an interface used to exchange data with an external device through a communication network such as the Internet. The bus line 507 is, for example, an address-data bus or a data bus, which electrically connects the multiple components such as the CPU 501 to each other.

The liquid discharge control unit 207 includes a main scanning driver 508 and a liquid discharge driver 509. The main scanning driver 508 controls movement of the carriage 600 in the main-scanning direction, i.e., the width direction of the sheet S. The liquid discharge driver 509 is a driver for controlling the driving of the liquid discharger 15.

The liquid discharger 15 and the liquid discharge driver 509 are mounted on the carriage 600. When the carriage 600 moves in the main-scanning direction, the liquid discharger 15 moves in the width direction of the sheet S, and the liquid is discharged from the liquid discharger 15 onto the sheet S which is intermittently conveyed. Thus, an image is formed on the sheet S.

The conveyance control unit 208 includes a sub-scanning driver 510. The sub-scanning driver 510 controls the conveyance of the sheet S by the conveyor 400.

The liquid discharger 15 may include a serial-type liquid discharge head that discharges liquid onto a sheet S while moving in the width direction of the sheet S or may include a line-type liquid discharge head that discharges liquid onto a sheet S without moving. The liquid discharge driver 509 may not be mounted on the carriage 600 and may be connected to a bus line outside the carriage 600. Each one of the main scanning driver 508, the liquid discharge driver 509, and the sub-scanning driver 510 may be a function implemented by a command executed by the CPU 501 based on a program.

Method for Controlling Heat Source

Figure 6:
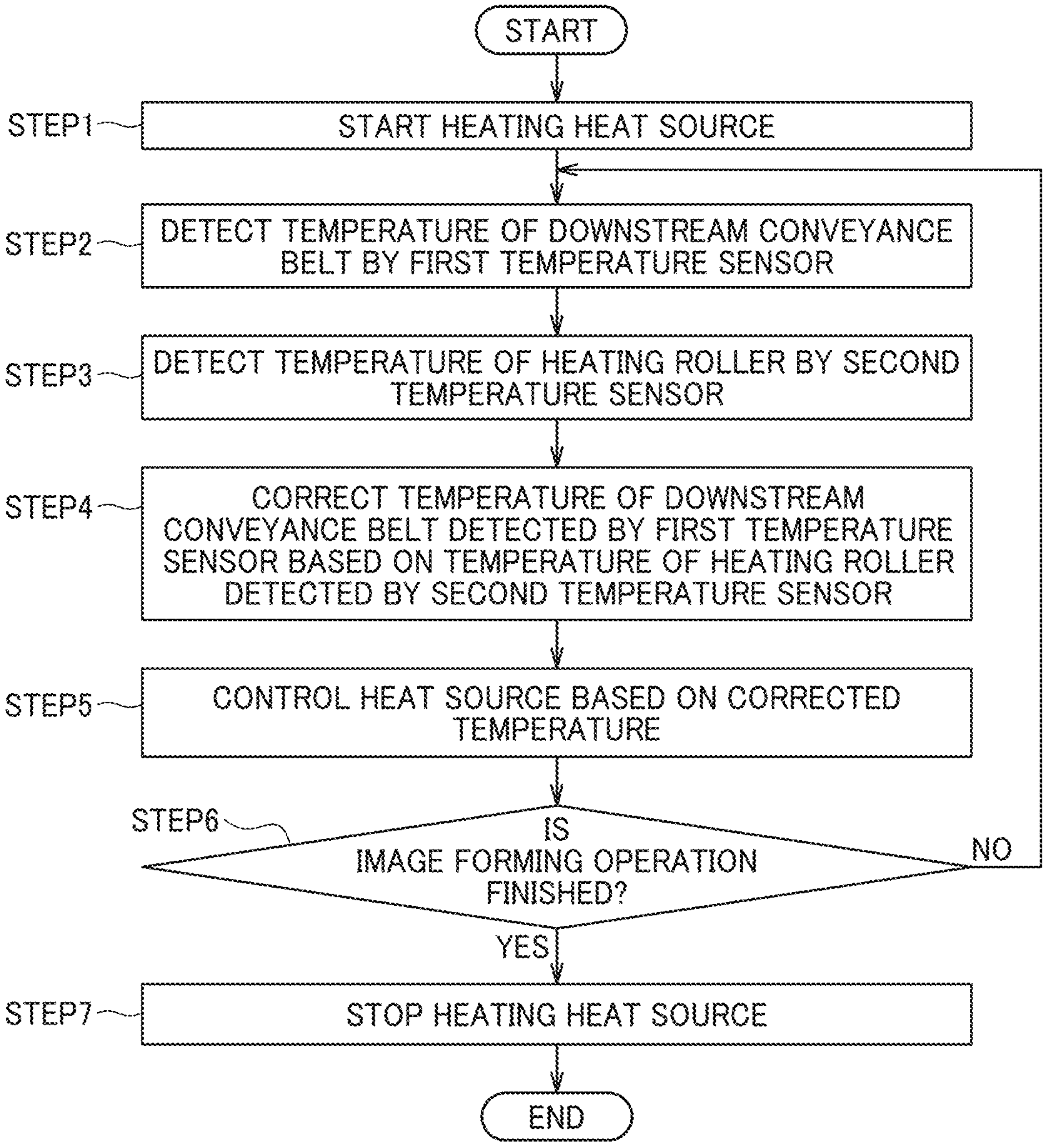
FIG. 6 is a flowchart illustrating a process of controlling a heat source of a heating apparatus according to an embodiment of the present disclosure.

Next, a method of controlling the heat source 40 of the heating device 30 according to an embodiment of the present disclosure is described with reference to the flowchart of FIG. 6.

When the image forming operation is started and the downstream conveyance belt 32 starts to move in the circumferential direction, the heat source 40 inside the heating roller 39 starts to generate heat (Step 1 in FIG. 6), and the downstream conveyance belt 32 is heated. The first temperature sensor 34 detects the temperature of the downstream conveyance belt 32 (Step 2 in FIG. 6). At the same time, the second temperature sensor 35 detects the temperature of the heating roller 39 (Step 3 in FIG. 6). The detection of the temperature of the downstream conveyance belt 32 by the first temperature sensor 34 and the detection of the temperature of the heating roller 39 by the second temperature sensor 35 may be performed at a similar timing or at different timings. The temperature data detected by the first temperature sensor 34 and the second temperature sensor 35 is input to the temperature corrector 36. Subsequently, the temperature corrector 36 corrects the temperature detected by the first temperature sensor 34 based on the temperature detected by the second temperature sensor 35 (Step 4 in FIG. 6). The temperature data corrected by the temperature corrector 36 is sent to the heat-source controller 37, and the heat-source controller 37 controls the heat source 40 based on the corrected temperature (Step 5 in FIG. 6).

The temperature corrector 36 subtracts the temperature detected by the second temperature sensor 35 from the temperature detected by the first temperature sensor 34 to perform temperature correction. In other words, the temperature of the heating roller 39 detected by the second temperature sensor 35 is subtracted from the temperature of the downstream conveyance belt 32 detected by the first temperature sensor 34. By so doing, the influence of the infrared radiation of the heating roller 39 included in the temperature of the downstream conveyance belt 32 detected by the first temperature sensor 34 is removed. Subsequently, until the image forming operation is finished (NO in Step 6 of FIG. 6), the temperature detection by the first temperature sensor 34, the temperature detection by the second temperature sensor 35, and the control of the heat source 40 based on the temperature corrected using the detected temperatures of the first temperature sensor 34 and the second temperature sensor 35, are repeated. When the image forming operation is finished (YES in Step 6 in FIG. 6), the heat source 40 stops generating heat (Step 7 in FIG. 6), and the control of the heat source 40 is also finished.

As described above, in embodiments of the present disclosure, removing the influence of the infrared radiation of the heating roller 39 from the temperature of the downstream conveyance belt 32 detected by the first temperature sensor 34 enhances the accuracy of the temperature of the downstream conveyance belt 32 obtained from the detection result of the first temperature sensor 34. Accordingly, the heat source 40 can be appropriately controlled.

Temperature Difference of Detected Temperature

The value obtained by subtracting the temperature detected of the heating roller 39 by the second temperature sensor 35 from the temperature of the downstream conveyance belt 32 detected by the first temperature sensor 34, in other words, the temperature difference between the temperatures detected by the first temperature sensor 34 and the second temperature sensor 35, varies depending on the materials of the downstream conveyance belt 32 and the heating roller 39.

Figure 7:
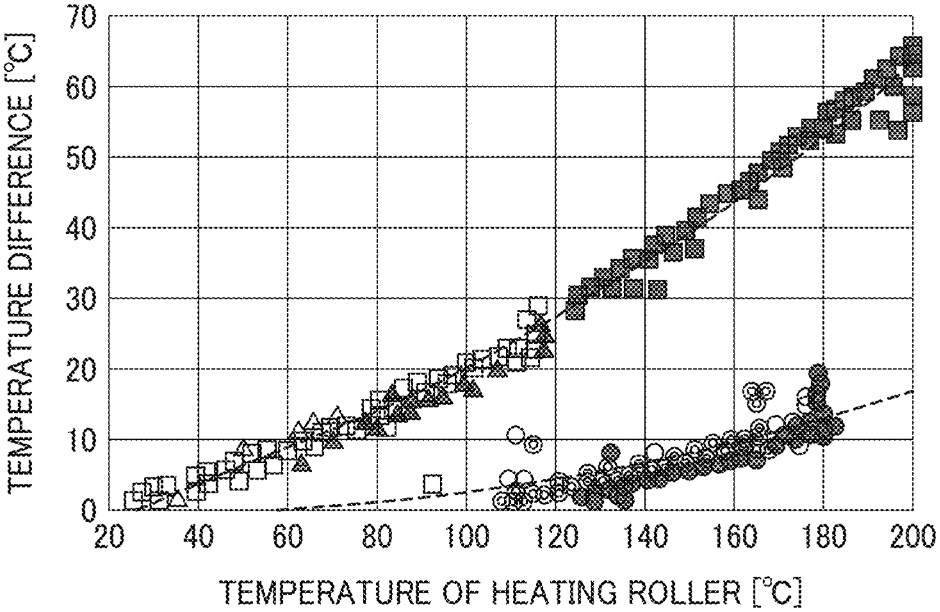
FIG. 7 is a graph illustrating a relation between a material of a downstream conveyance belt and temperatures detected by a first temperature sensor and a second temperature sensor.

FIG. 7 is a graph illustrating a relation between the material of the downstream conveyance belt 32 and the temperatures detected by the first temperature sensor 34 and the second temperature sensor 35.

In FIG. 7, the horizontal axis represents the temperature of the heating roller 39 detected by the second temperature sensor 35, and the vertical axis represents the temperature difference obtained by subtracting the temperature of the heating roller 39 detected by the second temperature sensor 35 from the temperature of the downstream conveyance belt 32 detected by the first temperature sensor 34. The values that are plotted by signs ●, ○, and ◎ in FIG. 7 are values when the downstream conveyance belt 32 is made of a metallic material without black coating. The values that are plotted by signs Δ, ▲, □, and ■ are values when the downstream conveyance belt 32 is made of a metallic material with black coating.

As illustrated in FIG. 7, the temperature difference between the temperature detected by the first temperature sensor 34 and the temperature detected by the second temperature sensor 35 is larger when the downstream conveyance belt 32 is coated in black than when the downstream conveyance belt 32 is not coated in black. From this, when the downstream conveyance belt 32 is coated in black, the temperature detected by the first temperature sensor 34 is greatly influenced by the infrared radiation of the heating roller 39, and the temperature of the downstream conveyance belt 32 is detected as a value larger than the actual temperature.

For this reason, in order to accurately obtain the temperature of the downstream conveyance belt 32, preferably, the temperature corrector 36 corrects the temperature detected by the first temperature sensor 34 based on the correction value corresponding to the material of the downstream conveyance belt 32 in addition to the temperature detected by the second temperature sensor 35.

Specifically, the temperature of the downstream conveyance belt 32 is preferably calculated by the following formula using a correction value corresponding to the material of the downstream conveyance belt 32.

$$\text{Temperature of downstream conveyance belt} = T1 - T2 \times \alpha \qquad \text{Formula}$$

In the formula, T1 is the temperature detected by the first temperature sensor 34, T2 is the temperature detected by the second temperature sensor 35, and a is a corrected value a corresponding to the material of the downstream conveyance belt 32.

As described above, the temperature correcting unit 36 corrects the temperature T2 detected by the first temperature sensor 34 based on the correction values a corresponding to the material of the downstream conveyance belt 32 in addition to the temperature T1 detected by the second temperature sensor 35. Accordingly, the temperature of the downstream conveyance belt 32 can be obtained with higher accuracy.

Taking the relation between the material of the downstream conveyance belt 32 and the detected temperatures illustrated in FIG. 7 as an example, when the downstream conveyance belt 32 is made of a metal material without black coating, the influence of the infrared radiation of the heating roller 39 on the first temperature sensor 34 is small. Accordingly, the correction value a in the formula is set to, for example, 0.12. By contrast, when the downstream conveyance belt 32 is made of a metal material coated in black, the influence of the infrared radiation of the heating roller 39 on the first temperature sensor 34 is large. Accordingly, the correction value a in the formula may be set to, for example, 0.37.

Figure 8:
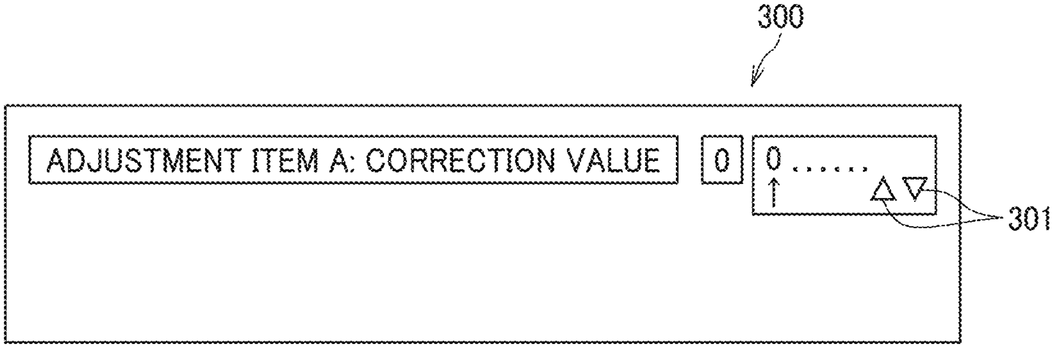
FIG. 8 is a diagram illustrating a correction-value setting button displayed on a display screen of an input unit, according to an embodiment of the present disclosure.

The correction value a is set, for example, by operating the display screen of the input unit 300 illustrated in FIG. 8. The correction value a that corresponds to the material of the downstream conveyance belt 32 may be acquired in advance. Then, it is satisfactory that the correction value setting button 301 displayed on the display screen is pressed and the correction value a corresponding to the material is input.

The influence on the temperature detected by the first temperature sensor 34 also varies depending on the material of the heating roller 39 in addition to the material of the downstream conveyance belt 32. Accordingly, the temperature T1 detected by the first temperature sensor 34 may be corrected by the temperature corrector 36 based on the correction value a corresponding to the material of the heating roller 39. The correction value a and the correction method may be changed depending on, for example, whether the material of the heating roller 39 is metal or resin, whether the metal is aluminum or copper, the type or model number of the heating roller 39, and the difference in thermal conductivity of the heating roller 39. For example, the correction value a may be set to be low in a case in which the heating roller 39 is formed of a material having a relatively low thermal conductivity. The correction value a may be set to be high in a case in which the heating roller 39 is formed of a material having a relatively high thermal conductivity. Further, the temperature T1 detected by the first temperature sensor 34 may be corrected based on the correction value a corresponding to both the material of the heating roller 39 and the material of the downstream conveyance belt 32.

The embodiments of the present disclosure have been described above. However, embodiments of the present disclosure are not limited to the above-described embodiments.

For example, the sheet S employed in the above-described embodiments may be a sheet to which the liquid can be at least temporarily attached, a sheet to which the liquid is attached and fixed, or a sheet to which the liquid is attached and permeates. Specifically, the sheet S includes not only a sheet of paper but also, for example, a resin film, wallpaper, and an electronic board. Examples of the material of the sheet include paper, leather, metal, plastic, glass, wood, and ceramics. The sheet S may be a continuous sheet, i.e., a roll sheet, formed in a long shape or a cut sheet cut into a predetermined size in advance.

In the above-described embodiments, the example in which the temperature of the conveyance belt, i.e., the downstream conveyance belt 32, that conveys the sheet is detected to control the heat source 40 has been described. However, the embodiments of the present disclosure can be applied to a device that heats a belt employed for a purpose other than conveyance, in addition to a belt that conveys a conveyance object other than a sheet.

The embodiments of the present disclosure are not limited to an inkjet-type image forming apparatus that discharges ink onto a sheet to form an image. However, the embodiments of the present disclosure can also be applied to a liquid discharge apparatus that discharges liquid other than ink. For example, the liquid discharge apparatus according to the embodiments of the present disclosure may be a liquid discharge apparatus that does not form an image, such as an apparatus that ejects a treatment liquid to a sheet before an image is formed to modify the surface of the sheet, in addition to the image forming apparatus.

The above-described embodiments of the present disclosure have at least the following aspects.

First Aspect

A heating device includes a belt, a heater, a first temperature sensor, a second temperature sensor, a temperature corrector, and a heat-source controller. The heater includes a heat source to heat the belt. The first temperature sensor is disposed at a position facing the heater via the belt and separated from the belt to detect a first temperature of the belt. The second temperature sensor is disposed at a position directly facing the heater and separated from the heater, to detect a second temperature of the heater. The temperature corrector corrects the first temperature detected by the first temperature sensor based on the second temperature detected by the second temperature sensor. The heat-source controller controls the heat source based on the first temperature corrected by the temperature corrector.

Second Aspect

In the heating device according to the first aspect, the temperature corrector corrects the first temperature detected by the first temperature sensor based on a correction value corresponding to at least one of a material of the belt and a material of the heater, in addition to the second temperature detected by the second temperature sensor.

Third Aspect

In the heating device according to the first aspect, the temperature of the belt is calculated based on a following formula of Temperature of belt=$T1-T2\times\alpha$, where T1 is the first temperature detected by the first temperature sensor, T2 is the second temperature detected by the second temperature sensor, and a is a correction value corresponding to a material of the belt or a material of the heater.

Fourth Aspect

In the heating device according to any one of the first to third aspects, the belt includes a conveyance belt to convey a conveyance object, and the heater includes a heating roller to contact the conveyance belt to heat the conveyance belt.

Fifth Aspect

In the heating device according to any one of the first to fourth aspects, the first temperature sensor includes a first radiation thermometer to receive first infrared radiation emitted from the belt and detects the first temperature of the belt. The second temperature sensor includes a second radiation thermometer to receive second infrared radiation emitted from the heater and detects the second temperature of the heater.

Sixth Aspect

A liquid discharge apparatus includes a liquid discharger and the heating device according to any one of the first to fifth aspects. The liquid discharger includes a liquid discharge unit to discharge liquid onto a conveyance object. The heating device heats the conveyance object to which liquid is applied by the liquid discharger.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments such as the temperature corrector 36 and the heat-source controller 37 may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A heating device comprising:

a belt;

a heater including a heat source to heat the belt;

a first temperature sensor, at a position facing the heater via the belt and separated from the belt, to detect a first temperature of the belt;

a second temperature sensor, at a position directly facing the heater and separated from the heater, to detect a second temperature of the heater; and circuitry configured to:

correct the first temperature detected by the first temperature sensor based on the second temperature detected by the second temperature sensor; and control the heat source based on the first temperature corrected based on the second temperature.

2. The heating device according to claim 1, wherein the circuitry corrects the first temperature detected by the first temperature sensor based on a correction value corresponding to at least one of:

a material of the belt; and a material of the heater, in addition to the second temperature detected by the second temperature sensor.

3. The heating device according to claim 1, wherein the temperature of the belt is calculated based on a following formula of Temperature of belt=T1−T2×α, where T1 is the first temperature detected by the first temperature sensor;

T2 is the second temperature detected by the second temperature sensor; and

α is a correction value corresponding to a material of the belt or a material of the heater.

4. The heating device according to claim 1, wherein the belt includes a conveyance belt to convey a conveyance object, and the heater includes a heating roller to contact the conveyance belt to heat the conveyance belt.

5. The heating device according to claim 1, wherein the first temperature sensor includes a first radiation thermometer to receive first infrared radiation emitted from the belt and detect the first temperature of the belt; and the second temperature sensor includes a second radiation thermometer to receive second infrared radiation emitted from the heater and detect the second temperature of the heater.

6. A liquid discharge apparatus comprising:

a liquid discharger to discharge liquid onto a conveyance object; and the heating device according to claim 1, to heat the conveyance object onto which the liquid is applied by the liquid discharger.

* * * * *